(12) United States Patent
Goerend

(10) Patent No.: US 9,976,642 B2
(45) Date of Patent: May 22, 2018

(54) TORQUE CONVERTER WITH IMPROVED LOCK-UP CLUTCH

(71) Applicant: David J. Goerend, Saint Lucas, IA (US)

(72) Inventor: David J. Goerend, Saint Lucas, IA (US)

( * ) Notice: Subject to any disclaimer, the term of this patent is extended or adjusted under 35 U.S.C. 154(b) by 400 days.

(21) Appl. No.: 14/812,000

(22) Filed: Jul. 29, 2015

(65) Prior Publication Data

US 2016/0033022 A1     Feb. 4, 2016

Related U.S. Application Data

(60) Provisional application No. 62/031,957, filed on Aug. 1, 2014.

(51) Int. Cl.
*F16H 45/02* (2006.01)
*F16D 13/64* (2006.01)

(52) U.S. Cl.
CPC ............ *F16H 45/02* (2013.01); *F16D 13/644* (2013.01); *F16H 2045/0284* (2013.01)

(58) Field of Classification Search
CPC .............................................. F16H 2045/0284
See application file for complete search history.

(56) References Cited

U.S. PATENT DOCUMENTS

| | | | | |
|---|---|---|---|---|
| 4,926,988 A * | 5/1990 | Kundermann | .......... | F16H 45/02 192/212 |
| 4,951,788 A * | 8/1990 | Martin | ..................... | F16H 45/02 192/3.29 |
| 6,367,604 B1 * | 4/2002 | Kerr | ......................... | F16D 15/00 192/105 B |
| 2005/0199461 A1 * | 9/2005 | Zuehl | ...................... | F16H 45/02 192/3.29 |
| 2008/0149441 A1 * | 6/2008 | Sturgin | .................... | F16H 45/02 192/3.25 |
| 2017/0343054 A9 * | 11/2017 | Youngwerth | .......... | F16D 13/683 |

* cited by examiner

*Primary Examiner* — Mark A Manley
(74) *Attorney, Agent, or Firm* — McKee, Voorhees & Sease, PLC

(57) ABSTRACT

An improved torque converter and lock-up clutch assembly includes a sleeve fixed on the sidewall of the lock-up clutch to extend the depth of the clutch, and thereby allow additional clutch packs to be mounted in the cover. The additional clutch packs increase the torque capacity of the assembly. The sleeve includes an annular groove with a snap ring to retain the clutch packs and backing plate in the lock-up clutch cover.

19 Claims, 3 Drawing Sheets

TORQUE CONVERTER WITH IMPROVED LOCK-UP CLUTCH

CROSS-REFERENCE TO RELATED APPLICATIONS

This application claims priority under 35 U.S.C. § 119 to provisional application Ser. No. 62/031,953 filed Aug. 1, 2014, herein incorporated by reference in its entirety.

BACKGROUND OF THE INVENTION

Torque converters have been known and used in combination with automatic transmissions of automobiles for quite some time. Generally, a torque converter consists of a housing, an impeller or pump, a turbine, a stator containing a one-way clutch, and a lock-up clutch.

The impeller is hemispherical with an outer wall having inner and outer surfaces, and a plurality of vanes radially mounted to the concave inner surface of the impeller wall. The turbine is rotatably mounted within a back wall, and also contains a plurality of vanes opposite the impeller vanes. The impeller wall is welded to the converter body to form an enclosed housing for the torque converter. The stator is located between the impeller and the turbine. The impeller has an input shaft operatively connected to the engine drive shaft. The turbine has an output shaft attached to the transmission input shaft so as to rotate the output shaft of the transmission.

In use, fluid, such as oil, is added into the torque converter housing. When the engine shaft rotates the impeller, the fluid starts rotating as well. As the rotation speeds up, centrifugal forces cause the fluid to flow outward toward the impeller vanes. The impeller vanes direct the fluid towards the turbine vanes, wherein the force of the fluid causes the turbine to rotate in the same direction as the impeller. The turbine shaft rotates the transmission shaft, which causes the vehicle to begin moving. The orientation of the turbine vanes directs the fluid towards the center of the turbine, where the vanes of the stator direct the fluid back towards the impeller, and the fluid cycle is repeated. Initially, the impeller will be rotating at a much greater speed than the turbine, which results in energy loss between input from the motor and output to the transmission. However, when the vehicle reaches a higher speed (approximately 40 miles per hour), the impeller and turbine will be rotating at approximately the same speed. At this time, a lock-up clutch will mechanically connect the impeller and the turbine so that they rotate at exactly the same speed to transfer 100% of the power through the torque converter.

A lock-up clutch, such as in a Ford transmission, is installed in front of the turbine. When engaged, the clutch will rotate with and lock together the rotational speeds of the impeller and the turbine. This is called the "lock-up operation."

The torque transferred from the engine to the transmission via the torque converter depends, in part, on the number of plates in the lock-up clutch. Conventional lock-up clutches have 1-3 plates which are forced by a piston into contact with the torque converter casing so as to couple the turbine to the impeller at the desired engine speed. Generally, the more plates in the clutch, the greater the torque transmitted from the engine to the transmission. Multiple plates, called a clutch plate pack, are set within the clutch sidewall and covered with a backing plate, which in conventional practice is welded to the inside surface of the clutch sidewall. The clutch sidewall height limits the number of plates which can be installed, and thus limits the torque transmitted through the torque converter.

Accordingly, a primary objective of the present invention is the provision of an improved lock-up clutch for a torque converter which accommodates additional clutch plates to increase torque transfer from the engine to the transmission.

Another objective of the present invention is the provision of a torque converter with a lock-up clutch, and having a sleeve mounted over the clutch sidewall so as to increase the depth of the clutch cavity, thereby allowing a clutch plate pack with more plates to be installed for increased torque capacity of the clutch.

Still another objective of the present invention is the provision of a method for increasing the torque of a torque converter having a lock-up clutch.

Yet another objective of the present invention is the provision of the method of increasing the depth of a lock-up clutch housing or cover so as to allow additional clutch plates, and thereby increase the torque of the converter.

A further objective of the present invention is the provision of a lock-up clutch for a torque converter, with a clutch cover having an extended sidewall to accommodate additional clutch packs for enhanced torque transmission from the engine.

Another objective of the present invention is a method of increasing the height of a lock-up clutch sidewall for more clutch plates to provide increased torque in a torque converter.

A further objective of the present invention is the provision of a sleeve for an improved lock-up clutch which can be economically manufactured and easily installed the clutch cover on a torque converter.

These and other objectives will become apparent from the following description of the invention.

SUMMARY OF THE INVENTION

The present invention modifies a conventional torque converter lock-up clutch so as to enhance torque transfer from the engine to the transmission of a vehicle.

The modification includes a sleeve mounted on or slip fit over the sidewall of the lock-up clutch housing or cover so as to effectively extend the height of the sidewall. This extended height increases the depth of the cover so as to accommodate additional clutch packs, so as to generate more torque transfer. The sleeve is welded to the lock-up clutch sidewall, and includes an interior annular groove to receive a snap ring which retains the clutch packs in the clutch cover. Different height sleeves can be used, depending upon the number of clutch packs to be employed in the lock-up clutch.

DETAILED DESCRIPTION OF THE PREFERRED EMBODIMENTS

Figure 1:
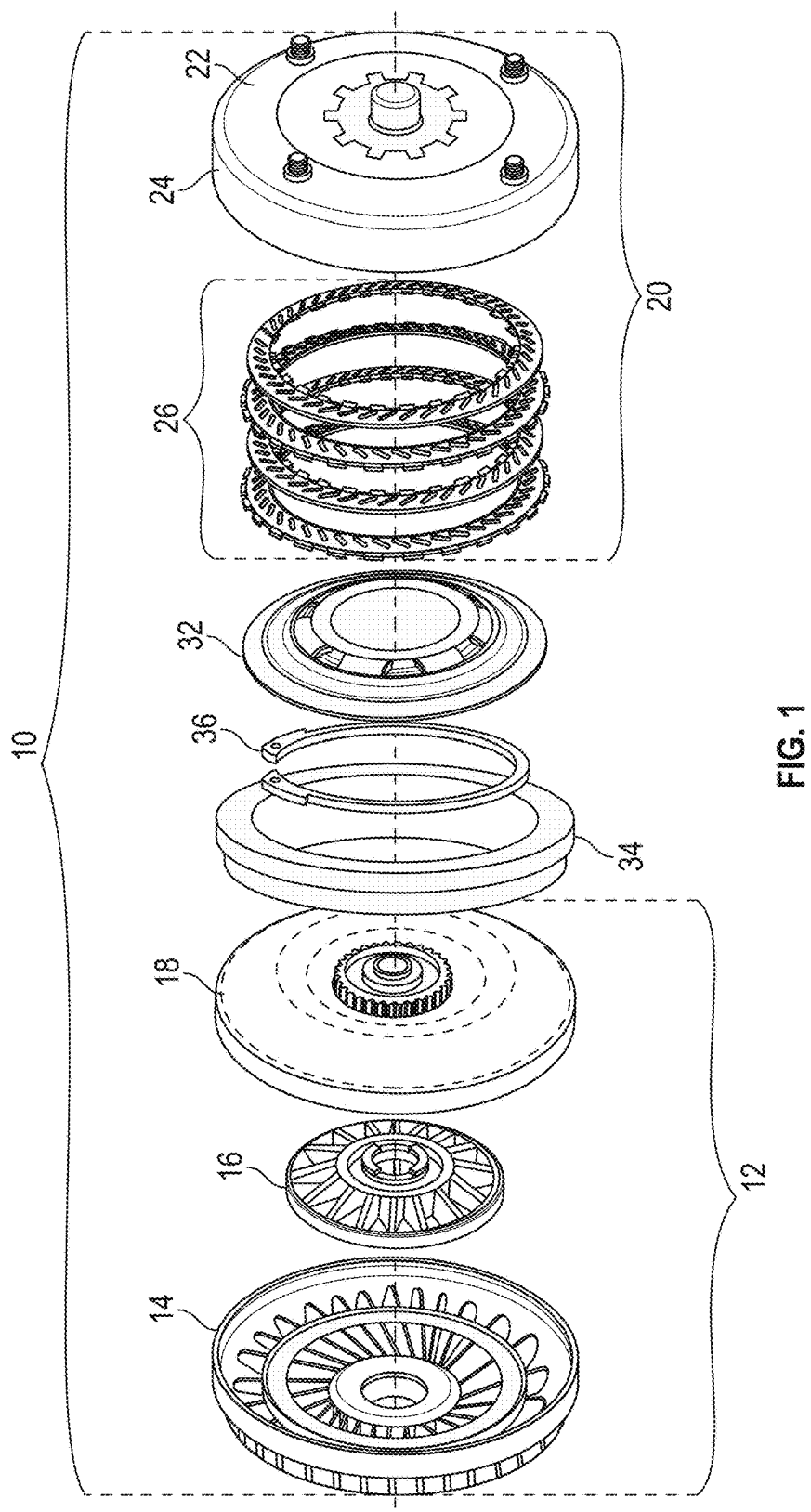
FIG. 1 is an exploded view showing the components of the torque converter with the lock-up clutch, according to the present invention.
Figure 2:
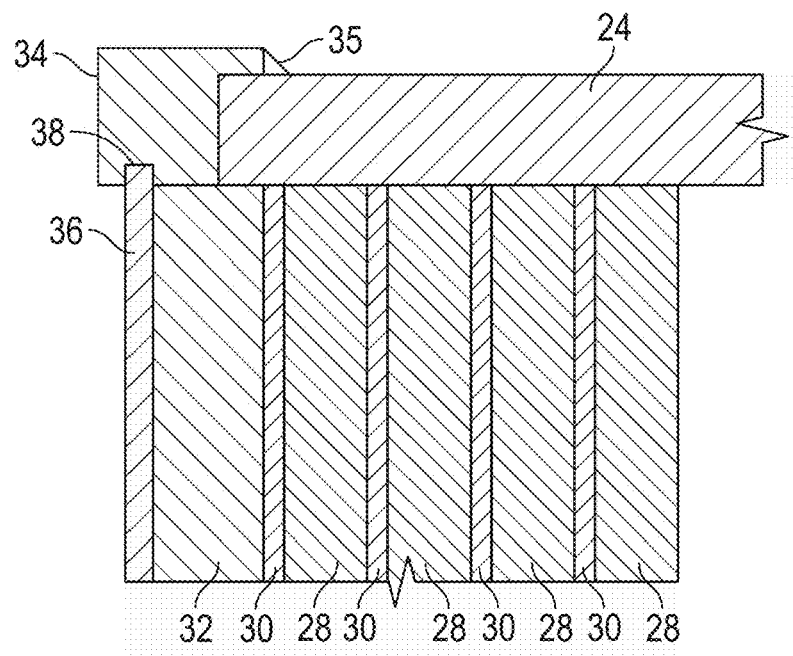
FIG. 2 is a sectional view showing a portion of the lock-up clutch with the added sleeve and additional clutch pack, in accordance with the present invention.

The torque converter and lock-up clutch assembly 10 of the present invention generates increased torque capacity, in comparison to a conventional torque converter and lock-up clutch assembly. The assembly 10 comprises a torque converter 12 having an impeller 14, a stator 16, and a turbine 18. The assembly also includes a lock-up clutch 20 having a cover or housing 22 with a circular sidewall 24. A plurality of clutch packs 26 are mounted within the cover 22. Each pack 26 includes a steel plate 28 and a fiber ring 30. A backing plate 32 is positioned on top of the clutch packs 26, and may be secured to the sidewall with weld beads 33 or retained by a snap ring (not shown) in a groove on the inside surface of the sidewall 24.

The structure of the torque converter 12 is conventional, and does not form a part of the present invention. Similarly, the structure and function of each clutch pack 26 is standard, and does form a part of the present invention.

Figure 3:
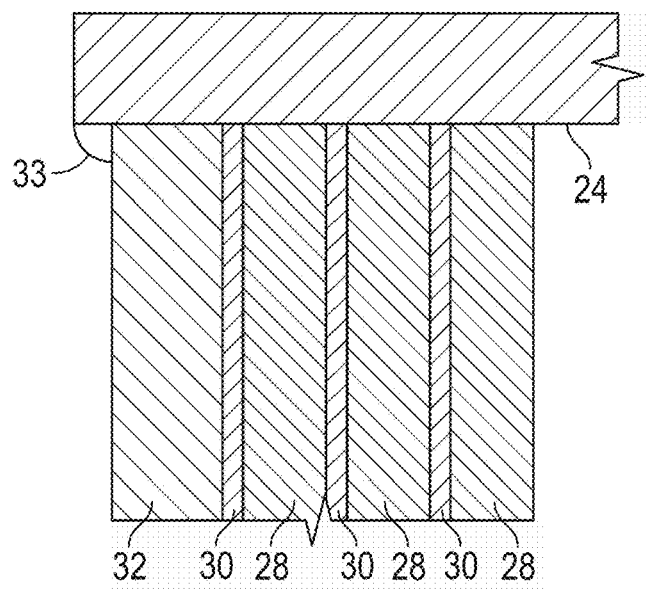
FIG. 3 is a sectional view of a conventional lock-up clutch.
Figure 4:
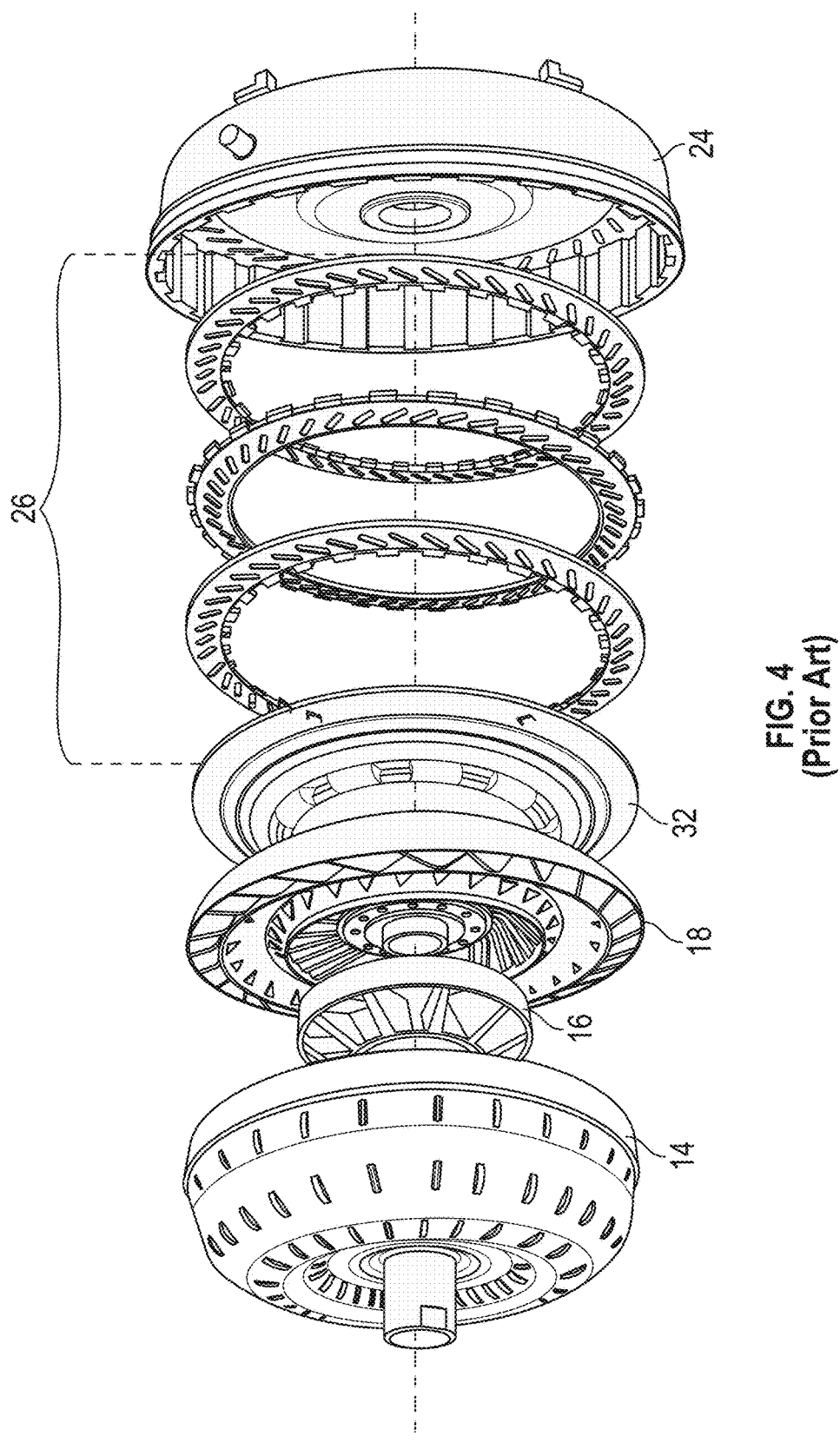
FIG. 4 is an exploded perspective view of a conventional torque converter with a lock-up clutch.

Due to the height of the sidewall 24, in a conventional lock-up clutch the number of plates or the packs is limited, which in turn, limits the torque which can be transferred through the torque converter 12. A typical lock-up clutch includes three clutch packs 26, as shown in FIGS. 3 and 4. Increasing the number of clutch packs will increase the torque capacity of the clutch 20 of the torque converter 12. However, increasing the number of packs 26 raises the backing plate 32 to a position that precludes securement of the backing plate 32 to the conventional clutch cover. Thus, additional plates cannot be added to the conventional lock-up clutch.

The present invention is directed towards an annular sleeve 34 which extends around and beyond the sidewall 24 of the lock-up clutch 20. Before the sleeve 34 is installed, the clutch plate packs, such as a set of four or five plates are set into the sidewall 24, and then the backing plate 32 is positioned over the packs. The sleeve 34 is then positioned around the sidewall 24. A retention on member on the sleeve 34 retains the backing plate 32 and plate packs 26 in position in the lock-up clutch 20. In a preferred embodiment, the retention member is a snap ring 36. The sleeve 34 has a groove 38 extending around the inside perimeter adjacent the upper end of the sleeve 34, which is adapted to receive the snap ring 36. In an alternative embodiment, the retention member is one or more a weld beads on the inside wall of the sleeve 34. The sleeve 34 is then welded with a continuous weld bead 35, or spaced apart weld beads, or otherwise fixed to the clutch cover 22 to effectively increase the height of the sidewall 24 and the depth of the cover 22.

The sleeve 34 allows one or more additional plate packs to be used in the lock-up clutch 20, thereby increasing the torque capacity of the clutch 20. The increased torque is desirable in certain applications, but could not be achieved with the standard lock-up clutch, which was normally limited to three clutch packs. It is understood that with a taller sleeve 34, clutch packs with more cumulative plates can be used, to further increase the torque transfer.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved torque converter having an impeller, a turbine, a stator, a lock-up clutch with a sidewall having an open end, and at least one clutch plate mounted within the side wall, the improvement comprising: a sleeve mounted on the sidewall and extending axially beyond the open end of the sidewall without extending internally, to extend a depth of the housing; at least one additional clutch plate mounted in the sidewall; a backing plate mounted over the additional clutch plate; a retention member on the sleeve to retain the backing plate and the additional clutch plate in position; and the sleeve and the sleeve and clutch sidewall each having inner surfaces which are substantially flush with one another.

2. The improved torque converter of claim 1 wherein the sleeve has a perimeter groove and the retention member is a ring snap fit into the groove to retain the backing plate and clutch plates within the sidewall.

3. The improved torque converter of claim 1 wherein the retention member is a weld bead.

4. The improved torque converter of claim 1 wherein the sleeve increases the depth of the lock-up clutch.

5. The torque converter of claim 1 wherein the clutch sidewall has internal splines and each clutch plate having peripheral tabs which matingly align with the splines.

6. The torque converter of claim 1 wherein the sleeve and the sidewall have a mating butt joint.

7. An improved lock-up clutch for a torque converter, comprising:
a clutch housing defining a clutch cavity with an open end and an inner surface with a plurality of splines;
a plurality of clutch plate packs mounted within the housing;
an additional clutch plate pack mounted over the plurality of clutch plate packs in the housing to increase torque of the clutch;
all of the clutch plate packs including peripheral tabs matingly aligned with the splines of the clutch housing; and
a sleeve mounted to the housing and extending axially beyond the open end of the housing and not radially into the housing to increase depth of the cavity and retain all of the clutch plate packs.

8. The improved lock-up clutch of claim 7 further comprising a back plate mounted in the housing over the additional clutch plate pack and within the sleeve.

9. The improved lock-up clutch of claim 8 further comprising a snap ring mounted in a groove of the sleeve to retain the back plate and clutch plate packs.

10. The improved lock-up clutch of claim 8 wherein the sleeve has an interior perimeter groove and a snap ring is snapped into the groove to retain the clutch plate packs.

11. The lock-up clutch of claim 7 wherein the clutch housing has sidewall with an inner surface and the sleeve has an inner surface which is substantially flush with the inner surface of the clutch housing.

12. The lock-up clutch of claim 7 wherein the housing and the sleeve have a mating butt joint.

13. The improved lock-up clutch of claim 7 wherein the sleeve is welded to the housing to increase the height of the housing.

14. A method of increasing torque capacity of a torque converter having a lock-up clutch with a housing and a first clutch plate pack within the housing, the method comprising: adding a second clutch plate pack to the clutch; placing a backing plate into the housing over the second clutch plate pack; sliding a sleeve over the housing so as to extend axial height of the housing without radial extension into the housing; and fixing the sleeve to the clutch housing such that inner surfaces of the sleeve and the housing are substantially flush with one another.

15. The method of claim 14 further comprising snapping a ring into a groove in the sleeve to retain the clutch plate packs and the backing plate within the housing.

16. The method of claim 14 wherein the sleeve is fixed by welding.

17. The method of claim 14 wherein the housing has a radial sidewall and the sleeve extends the effective height of the sidewall.

18. The method of claim 14 wherein the sleeve includes an inner sidewall and a ring extending radially inwardly from the sidewall to overlie the backing plate so as to retain the backing plate and the first and second clutch plate packs in the housing.

19. The method of claim 14 further comprising securing a retention member in the sleeve to retain the backing plate and plate packs in position.

* * * * *